US010962992B2

(12) United States Patent
Yeh et al.

(10) Patent No.: US 10,962,992 B2
(45) Date of Patent: Mar. 30, 2021

(54) APPARATUS WITH TWO ANCHORS

(71) Applicant: Industrial Technology Research Institute, Hsinchu (TW)

(72) Inventors: Chien-Nan Yeh, Tainan (TW); Chung-Yuan Su, Tainan (TW); Chih-Yuan Chen, Taipei (TW); Chao-Ta Huang, Hsinchu (TW); Yu-Wen Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 725 days.

(21) Appl. No.: 15/853,850

(22) Filed: Dec. 25, 2017

(65) Prior Publication Data

US 2019/0196520 A1    Jun. 27, 2019

(51) Int. Cl.
*G05D 15/00* (2006.01)
*G01L 5/00* (2006.01)
(Continued)

(52) U.S. Cl.
CPC ............ *G05D 15/00* (2013.01); *B41F 33/02* (2013.01); *B41K 3/62* (2013.01); *G01L 5/00* (2013.01); *G05G 5/02* (2013.01)

(58) Field of Classification Search
CPC ... G05D 15/00; Y10T 403/55; Y10T 403/551; Y10T 403/557; F16B 7/02; F16B 7/025;
(Continued)

(56) References Cited

U.S. PATENT DOCUMENTS 5,169,269 A * 12/1992 Tatematsu ............. F16B 13/068
   403/297
6,293,743 B1 * 9/2001 Ernst ..................... F16B 13/066
   411/24
(Continued)

FOREIGN PATENT DOCUMENTS

CN   1251408    4/2000
CN   2755340    2/2006
(Continued)

OTHER PUBLICATIONS

"Notice of Allowance of Taiwan Counterpart Application," dated Aug. 17, 2018, pp. 1-4.
(Continued)

*Primary Examiner* — Jonathan P Masinick
(74) *Attorney, Agent, or Firm* — JCIPRNET

(57) ABSTRACT

An apparatus with two anchors including a housing, a movable element, and a rotary element is provided. The housing includes a first expansion unit, a second expansion unit, and a linkage. First alignment structures are disposed in the movable element and anti-rotation structures are disposed in the linkage. When the movable element and the rotary element enter the housing from two ends and are coupled along an axis, the movable element and the rotary element can approach each other to expand the first expansion unit and the second expansion unit to form two anchors. The apparatus with two anchors secures a sensor in a variety of environments such as walls or machines. When the apparatus with two anchors fixes a sensor in a hole of a stamping machine, the impact force does not cause stress concentration on the sensor so as to improve the reliability of the sensor.

20 Claims, 9 Drawing Sheets

(51) Int. Cl.
*G05G 5/02* (2006.01)
*B41K 3/62* (2006.01)
*B41F 33/02* (2006.01)

(58) Field of Classification Search
CPC ........ F16B 7/04; F16B 7/0406; F16B 7/0413;
F16B 7/0433; F16B 7/182; F16B 13/04;
F16B 13/06; F16B 13/045; F16B 13/063;
F16B 31/02; F16B 2031/022; G01L 5/00
See application file for complete search history.

(56) References Cited

U.S. PATENT DOCUMENTS

| | | | |
|---|---|---|---|
| 7,186,050 B2 * | 3/2007 | Dean | F16B 7/025 |
| | | | 403/344 |
| 7,909,637 B2 * | 3/2011 | Montena | H01R 24/42 |
| | | | 439/489 |
| 8,387,340 B2 * | 3/2013 | Zimmer | F16B 13/144 |
| | | | 52/787.1 |
| 8,511,035 B2 * | 8/2013 | Zimmer | F16B 13/144 |
| | | | 52/699 |
| 8,857,132 B2 * | 10/2014 | Zimmer | F16B 5/0208 |
| | | | 52/787.1 |
| 9,341,527 B2 | 5/2016 | O'Bier, II et al. | |
| 9,359,830 B2 * | 6/2016 | Armstrong | F16B 7/0406 |
| 9,383,276 B2 | 7/2016 | Enoki et al. | |
| 9,719,544 B2 * | 8/2017 | Bay | F42B 6/04 |
| 2004/0253075 A1 * | 12/2004 | Liebig | F16B 13/066 |
| | | | 411/57.1 |
| 2009/0274534 A1 * | 11/2009 | Zimmer | F16B 13/12 |
| | | | 411/57.1 |
| 2014/0053666 A1 | 2/2014 | Aronstam et al. | |
| 2014/0260652 A1 | 9/2014 | Hsieh | |
| 2017/0232597 A1 | 8/2017 | Gaul | |

FOREIGN PATENT DOCUMENTS

| | | |
|---|---|---|
| CN | 202757686 | 2/2013 |
| CN | 203037389 | 7/2013 |
| CN | 103335764 | 11/2015 |
| CN | 105509948 | 4/2016 |
| CN | 105545898 | 5/2016 |
| CN | 105547553 | 5/2016 |
| CN | 105571756 | 5/2016 |
| CN | 104458089 | 8/2016 |
| CN | 106286553 | 1/2017 |
| CN | 107355458 | 11/2017 |
| TW | 099916 | 6/1988 |
| TW | 305453 | 5/1997 |
| TW | 200520933 | 7/2005 |
| TW | I263578 | 10/2006 |
| TW | M362991 | 8/2009 |
| TW | I315228 | 10/2009 |
| TW | 201216302 | 4/2012 |
| TW | M433561 | 7/2012 |
| TW | 201231246 | 8/2012 |
| TW | M451191 | 4/2013 |
| TW | I428230 | 3/2014 |
| TW | M476657 | 4/2014 |
| TW | I446373 | 7/2014 |
| TW | 201514385 | 4/2015 |
| WO | 2017020868 | 2/2017 |

OTHER PUBLICATIONS

"Office Action of China Counterpart Application", dated May 27, 2020, p. 1-p. 13.
G. Caliano et al., "A piezoelectric bimorph static pressure sensor", Sensor and Actuators A, vol. 46, Issues 1-3, Jan.-Feb. 1995, pp. 176-178.
Avrum Hollinger et al.,"Evaluation of Commercial Force-Sensing Resistors", NIME06. IRCAM, Jun. 2006, pp. 1-4.
Numpon Mahayotsanun et al.,"Tooling-integrated sensing systems for stamping process monitoring",International Journal of Machine Tools & Manufacture,vol. 9, Jun. 2009, pp. 634-644.
X.T. Zeng et al.,"Comparison of three advanced hard coatings for stamping applications", Surface and Coatings Technology, vol. 127, May 2000, pp. 38-42.

* cited by examiner

APPARATUS WITH TWO ANCHORS

TECHNICAL FIELD

The disclosure relates to an apparatus with anchors, and more particularly, to an apparatus with two anchors suitable for a variety of environments.

BACKGROUND

In general, the accuracy of the impact force of a high-impact manufacturing machine (such as a stamping machine) affects the yield of its product. The impact force of such manufacturing machines is generally controlled by a controller that adjusts the magnitude of the impact force according to the detections of a force sensor. Therefore, accuracy in the detection of the impact force and its fluctuations force has become the key technique in controlling product yield.

In FIG. 1 is shown a known force detection device. Referring to FIG. 1, a Taiwan Utility Model Patent No. M433561 discloses an improved structure of a force detection apparatus. The improved structure includes a fixed structure presenting at one end a deep hole 81 in a molded base 80. A sensing rod 50 with a pulling cone head 53 is locked by an adjustable nut 70 when fastened tight to a first threaded section 54 of the sensing rod 50. Moreover, the improved structure includes a transducer 40 and a transfer sleeve 60. The sensing rod 50 can adjust a sensing direction 56 so that the transducer 40 can accurately detect a shockwave value. A sensing transfer surface 64 is aligned with the sensing direction 56 of the sensing rod 50 by adjusting the sensing transfer surface 64 of the transfer sleeve 60 to transmit a sensed force to the transducer 40 using a fixed structure.

However, only a single end of the force detection apparatus is fixed in a hole of a machine 80, with the result that a piezoelectric film in the transducer 40 of the force detection apparatus is subjected to uneven forces. Fatigue occurs since the piezoelectric film is frequently subjected to uneven forces. As a result, the transducer 40 needs to be changed frequently, thereby forcing interruptions of the production line, and, ultimately, incurring in issues such as increased production costs and reduced productivity.

Moreover, known force detection apparatuses cannot adjust the sensitivity of the sensing apparatuses to machines with different impact forces. Therefore, known force detection apparatuses cannot accurately measure fine changes in impact forces, neither can they accurately predict process variations produced in the manufacture, not allowing a proper control of the manufacturing quality of the production line and resulting in an increase in the product defect rate.

Currently, smart manufacturing machines adopting Internet of Things techniques dominate in the manufacturing market. Therefore, the development of a highly reliable impact detection apparatus that can be secured in a hole of a machine via a fixing structure and that displays adjustable sensitivity to adapt to environments with different impact forces of manufacturing machine has become a main research topic for those skilled in the art.

SUMMARY

This disclosure provides an apparatus with two anchors that can retain reliability after sustaining repeated impacts, and the sensitivity thereof can be optimized according to the impact forces of different machines.

An apparatus with two anchors of the disclosure includes a housing, a movable element, and a rotary element. The housing includes at least one first expansion unit, at least one second expansion unit, and a linkage. The at least one second expansion unit includes at least one stopping structure. The linkage is connected to the at least one first expansion unit and the at least one second expansion unit. The linkage includes at least one anti-rotation structure. The movable element includes a first threaded unit and at least one first alignment structure. The first threaded unit is disposed at a side of the movable element. The rotary element includes a second threaded unit and at least one second alignment structure. The second threaded unit is disposed at a side of the rotary element. The at least one second alignment structure is disposed at another side of the rotary element. When the first threaded unit and the second threaded unit enter the housing and are coupled along an axis, the at least one first alignment structure and the at least one anti-rotation structure are coupled, and the at least one second alignment structure is coupled with the at least one stopping structure.

An apparatus with two anchors of the disclosure includes a housing, a movable element, and a rotary element. The housing includes at least one first expansion unit, at least one second expansion unit, and a linkage. The at least one second expansion unit includes at least one stopping structure. The linkage is connected to the at least one first expansion unit and the at least one second expansion unit. The linkage includes at least one anti-rotation structure. The movable element includes a first threaded unit, at least one first alignment structure, at least one space, and at least two slots. The first threaded unit is disposed at a side of the movable element. The rotary element includes a second threaded unit and at least one second alignment structure. The second threaded unit is disposed at a side of the rotary element. The at least one second alignment structure is disposed at another side of the rotary element. When the first threaded unit and the second threaded unit enter the housing and are coupled along an axis, the at least one first alignment structure and the at least one anti-rotation structure are coupled, and the at least one second alignment structure is coupled with the at least one stopping structure. The at least one space and the at least two slots open through the movable element, and the at least two slots are disposed at two sides of the at least one space and are connected through it. The apparatus with two anchors of the disclosure is suitable for detecting a physical quantity. The apparatus with two anchors includes a housing, a movable element, and a rotary element. The housing includes at least one first expansion unit, at least one second expansion unit, and a linkage. The at least one second expansion unit includes at least one stopping structure. The linkage is connected to the at least one first expansion unit and the at least one second expansion unit. The linkage includes at least one anti-rotation structure. The movable element includes a first threaded unit, at least one first alignment structure, at least one space, and at least two slots. The first threaded unit is disposed at a side of the movable element. The rotary element includes a second threaded unit, at least one second alignment structure, and a rotary pressing unit. The second threaded unit is disposed at a side of the rotary element. The at least one second alignment structure is disposed at another side of the rotary element. The rotary pressing unit is disposed between the second threaded unit and the at least one second alignment structure. When the first threaded unit and the second threaded unit enter the housing and are coupled along an axis, the at least one first alignment structure and the at least one anti-rotation structure are coupled, and the at least one second alignment structure is coupled with the at least one stopping structure. The at least one space and the at least two slots open through the movable element, and the at least two slots are disposed at two sides of the at least one space, and are connected through it.

Based on the above, in the apparatus with two anchors of an embodiment of the disclosure, the sensing unit can be disposed in the apparatus to detect a physical quantity, and, more precisely, can be disposed into the at least one space in the movable element. When disposed in the at least one space, the sensing unit can be subjected to an even force, thus preventing fatigue and increasing the reliability of the sensing unit. Moreover, the housing includes a first expansion unit and a second expansion unit to adjust the sensitivity of the measurement. Furthermore, when the first threaded unit and the second threaded unit enter the housing and are coupled along an axis, the first alignment structure and the anti-rotation structure are coupled, and the second alignment structure is coupled with the stopping structure. Finally, the space and the slots open through the movable element, so that the apparatus with two anchors can be more securely connected to a production machine. Moreover, an embodiment of the disclosure as the apparatus with two anchors can be extensively applied in holes of a variety of environments (such as a hole in a wall or a hole in a machine) with increased securement and stability.

Several exemplary embodiments and the accompanying figures are described below to provide further details of the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
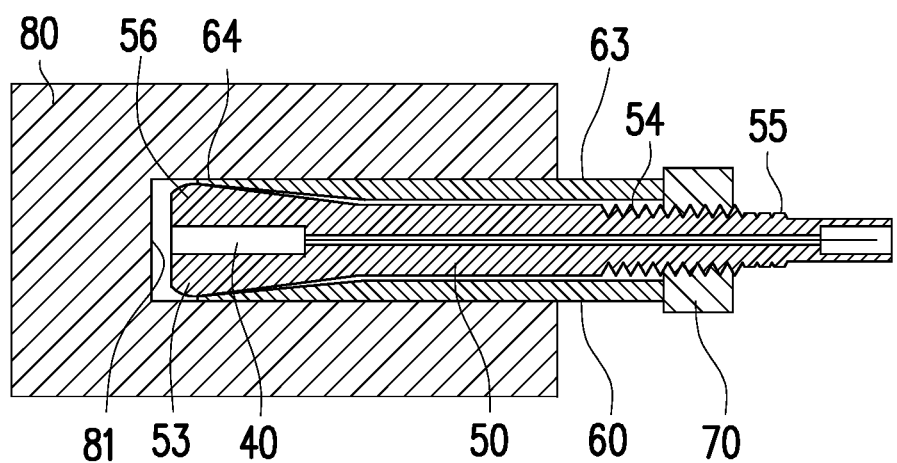
FIG. 1 is a schematic of a known force detection device.
Figure 2A:
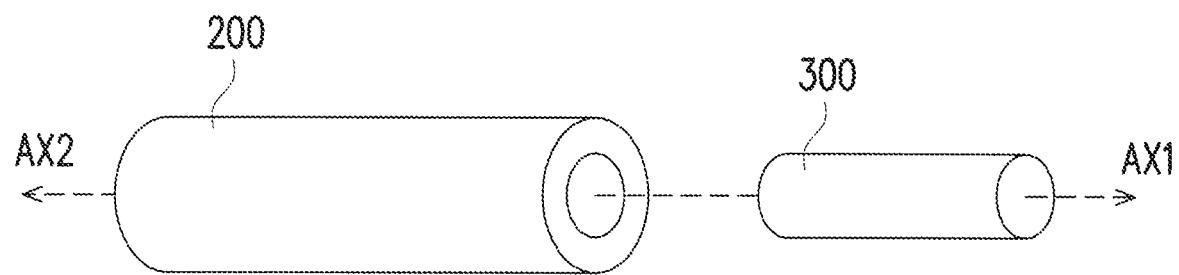
FIG. 2A and FIG. 2B are schematics of a coupling mechanism of an apparatus with two anchors according to an embodiment of the disclosure.
Figure 2B:
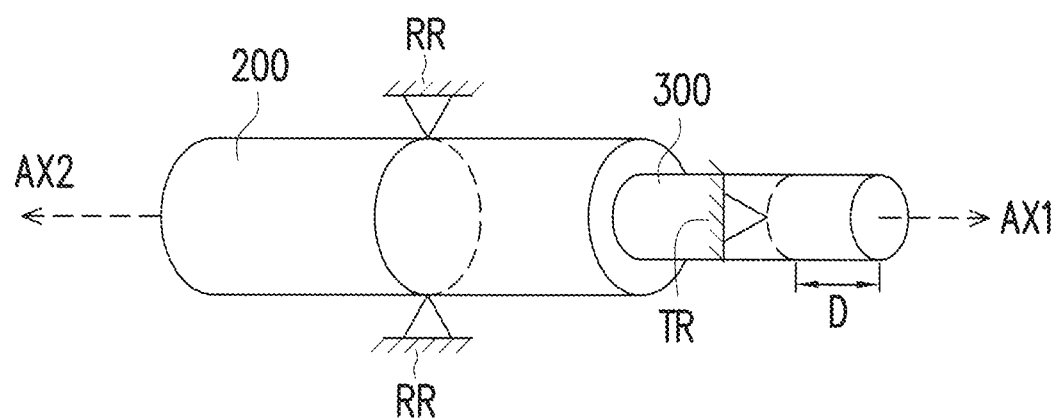

FIG. 2A and FIG. 2B are schematics of an assembly mechanism according to an embodiment of the disclosure. Referring first to FIG. 2A, the embodiment is an apparatus with two anchors in which the coupling structure can include a movable element 200 and a rotary element 300. For instance, an end of the movable element 200 can have a space suitable for accommodating the rotary element 300. The movable element 200 is suitable for moving along an axis AX1, and the rotary element 300 is suitable for rotating with the axis AX1 as the axis of rotation. The movable element 200 having a hollow shape as a sleeve can be coupled to the rotary element 300. Specifically, referring to FIG. 2B, the rotary element 300 rotates with the axis AX1 as the axis of rotation, such that the movable element 200 and the rotary element 300 begin to be coupled. At this point, the rotary element 300 is displaced toward another axis AX2 and the rotary element 300 guides the movable element 200 to be displaced toward the direction of the axis AX1. In other words, when the movable element 200 and the rotary element 300 begin to be coupled, the movable element 200 and the rotary element 300 approach each other, so that the distance between the two is gradually reduced. When the rotary element 300 guides the movable element 200, the rotation restraint structure RR restrains the movable element 200 from rotating and the translation restraint structure TR restrains the maximum displacement amount of the rotary element 300 along the axis AX2 to a distance D.

The embodiments of the rotation restraint structure RR and the translation restraint structure TR are described in detail in the following sections. Although the embodiments below show possible forms of the apparatus with two anchors, the design of the apparatus can be modified with application and demand, and is not limited to the following embodiments. Those having ordinary skill in the art can perform reasonable modifications and adjustments on the basis of the technical features of the embodiments of the disclosure based on the technical information at the time of application.

Figure 3A:
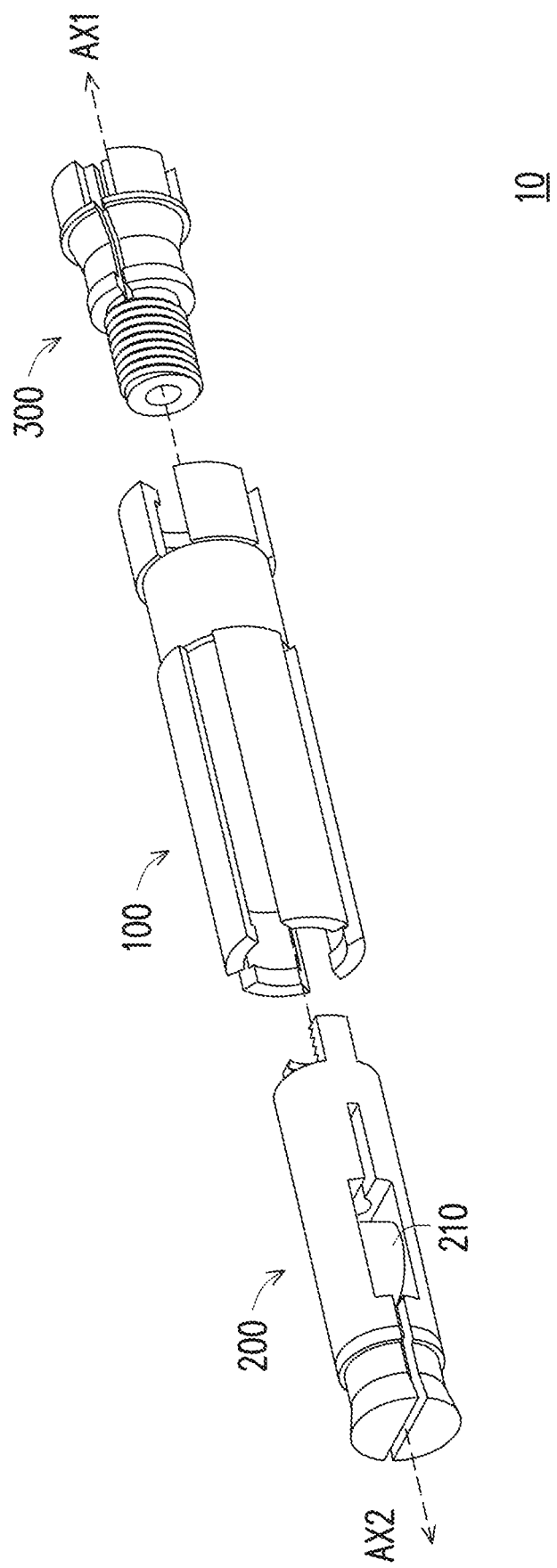
FIG. 3A is an exploded perspective view of an apparatus with two anchors according to an embodiment of the disclosure.
Figure 3B:
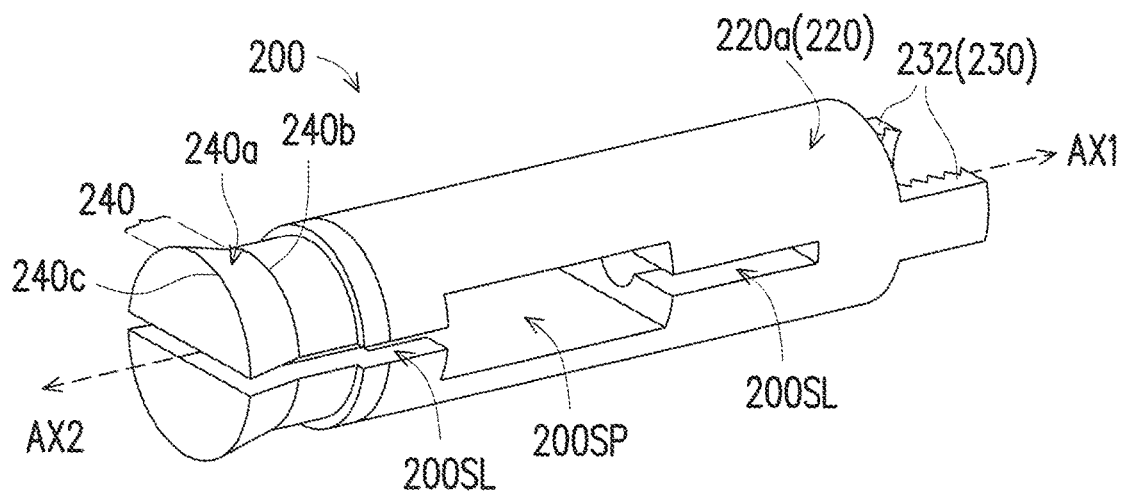
FIG. 3B to FIG. 3D are respectively schematics of a movable element, a housing, and a rotary element in the embodiment of FIG. 3A.
Figure 3C:
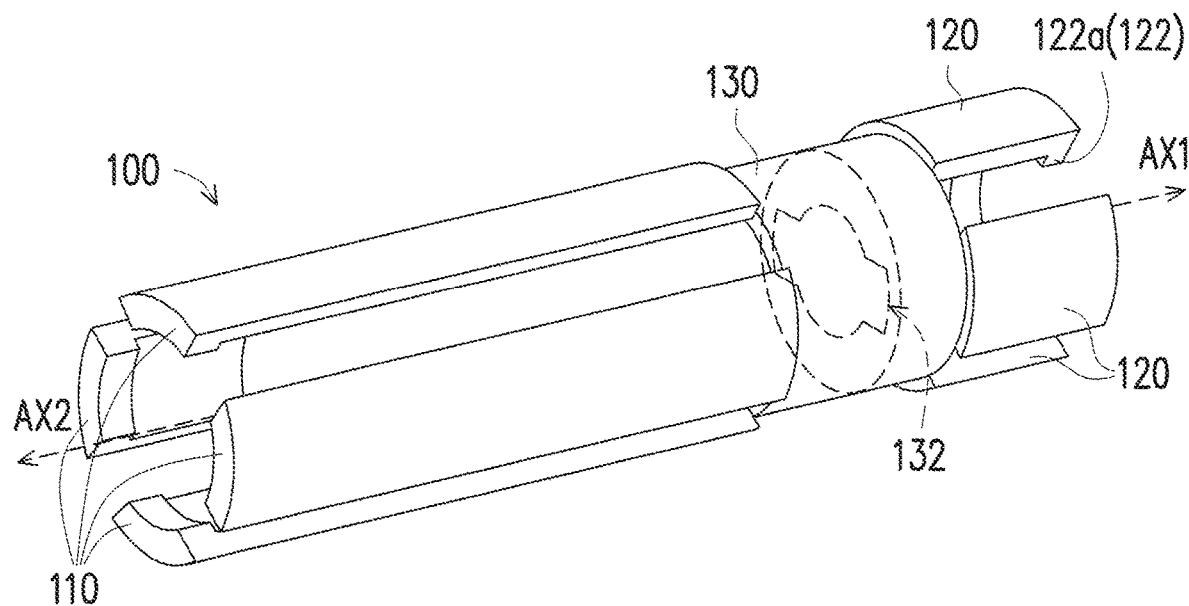
Figure 3D:
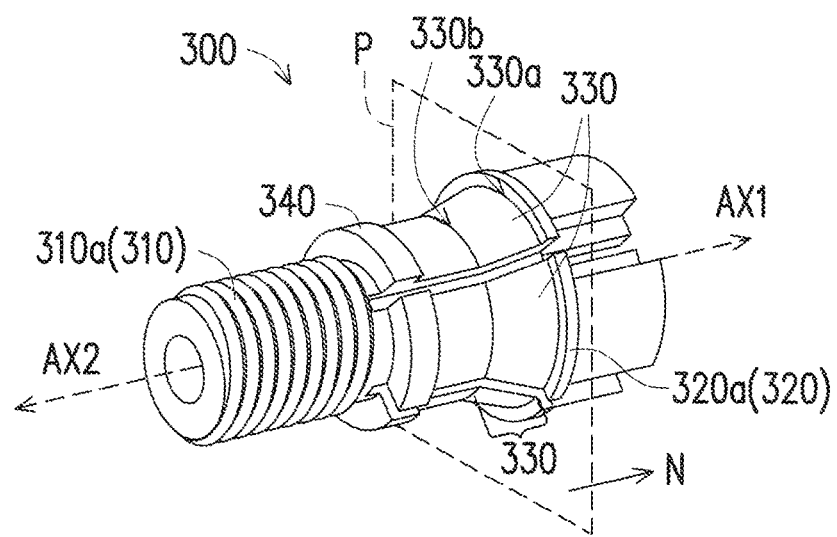

FIG. 3A is an exploded perspective view according to an embodiment of the disclosure. The embodiment is an apparatus with two anchors 10. FIG. 3B to FIG. 3D are respectively schematics of a movable element 200, a housing 100, and a rotary element 300 in the embodiment of FIG. 3A. First, referring to FIG. 3A, the apparatus with two anchors 10 includes the housing 100, the movable element 200, and the rotary element 300. For instance, the movable element 200 and the rotary element 300 can be coupled along the axis AX1 and accommodated in the housing 100. In some embodiments, the movable element 200 can include a sensing unit 210 to detect a physical quantity. The sensing unit 210 can include a transducer to change the detected physical quantity into an electrical signal for output. For instance, the sensing unit 210 can include a piezoelectric plate. The piezoelectric plate can convert the pressure subjected thereon into an electrical signal.

Specifically, referring to FIG. 3B, the movable element 200 includes a first threaded unit 220 and at least one first alignment structure 230. The first threaded unit 220 can be disposed at a side of the movable element 200. For instance, a first thread 220a can be disposed on the inner surface of the first threaded unit 220. In some embodiments, the first alignment structure 230 can be a first bump 232, and the extending direction of the first bump 232 is, for instance, parallel to the axis AX1. In other embodiments, the first thread 220a disposed on the inner surface of the first threaded unit 220 can be extended to the inner surface of the first bump 232. The movable element 200 can also include at least one space 200SP, at least two slots 200SL, and a movable pressing unit 240. For instance, the first alignment structure 230 can be disposed at a side of the movable element 200, and the movable pressing unit 240 can be disposed at another side of the movable element 200. The space 200SP and the slots 200SL opens through the movable element 200, and the two slots 200SL are communicated with the space 200SP. For instance, of the at least two slots 200SL, one of the slots 200SL is disposed between the space 200SP and the first threaded unit 220, and another slot 200SL opens through the movable pressing unit 240 of the movable element 200.

In some embodiments, the movable pressing unit 240 can be a column, and the slots 200SL separate the column into two parts. The column includes, for instance, an inner bottom surface facing the first alignment structure 230 and an outer bottom surface opposite to the inner bottom surface. The area of the outer bottom surface is, for instance, greater than the area of the inner bottom surface. For instance, a side surface of the movable pressing unit 240 is an inclined surface 240a. The inclined surface 240a has an inner periphery 240b facing the first threaded unit 220 and an outer periphery 240c opposite to the inner periphery 240b, and the perimeter of the outer periphery 240c is greater than that of the inner periphery 240b. In an embodiment in which the sensing unit 210 is disposed in the space 200 SP (as illustrated in FIG. 3A), the sensing unit 210 can detect a physical quantity, such as an impact force generated by a stamping machine. The design having the two slots 200SL communicated with the space 200SP and the design having the two slots 200SL open through the movable pressing unit 240 and the movable element 200 allow the sensing unit 210 disposed in the space 200SP of the movable element 200 to be subjected to a uniform force. Therefore, stress will not concentrate on the sensing unit 210 so that fatigue of the sensing unit 210 can be prevented, thereby increasing the reliability of the sensing unit 210.

Referring to FIG. 3C, the housing 100 includes at least one first expansion unit 110, at least one second expansion unit 120, and a linkage 130. The second expansion unit 120 can include at least one stopping structure 122. For instance, the stopping structure 122 can be a second bump 122a, and the extending direction of the second bump 122a is, for instance, perpendicular to the axis AX1. In some embodiments, the first expansion unit 110 and the second expansion unit 120 are, for instance, both expandable beam structures. The linkage 130 is disposed between the first expansion unit 110 and the second expansion unit 120 and it is connected to the first expansion unit 110 and the second expansion unit 120. The linkage 130 includes at least one anti-rotation structure 132. For instance, the anti-rotation structure 132 can be a groove, and the shape of the groove can correspond to the shape of the first bump 232 of the movable element 200. Therefore, after the housing 100 is coupled to the movable element 200, the first bump 232 is coupled to the anti-rotation structure 132 (groove) to form the rotation restraint structure RR so as to prevent the movable element 200 from rotating.

In some embodiments, when the housing 100, the movable element 200, and the rotary element 300 are coupled, and when the anti-rotation structure 132 located in the linkage 130 of the housing 100 is coupled with the second alignment structure 320, the movable element 200 can be prevented from rotating. When the stopping structure 122 located in the second expansion unit 120 of the housing 100 is coupled with the second alignment structure 320, the displacement of the rotary element 300 can be restrained. The restraining mechanism of the anti-rotation structure 132 and the stopping structure 122 is described in detail below. In an embodiment in which the first expansion unit 110 and the second expansion unit 120 are, for instance, expandable beam structures, the apparatus with two anchors can be disposed in a hole (not shown) of a production machine. When the movable element 200 and the rotary element 300 enter the housing 100 from two opposite ends of the housing 100 to be coupled, the movable element 200 and the rotary element 300 approach each other, so that the expansion units (such as the first expansion unit 110 and the second expansion unit 120) of the housing 100 are expanded. As a result, the apparatus with two anchors can be securely fixed in the hole of a production machine.

Referring to FIG. 3D, the rotary element 300 includes a second threaded unit 310 and at least one second alignment structure 320. For instance, the second threaded unit 310 is disposed at a side of the rotary element 300, and the second alignment structure 320 is disposed at another side of the rotary element 300, opposite to the second threaded unit 310. In some embodiments, the second thread 310a can be disposed on the outer surface of the second threaded unit 310. For instance, the thread shape of the second thread 310a and the thread shape of the first thread 220a of the movable element 200 can match with one another. Accordingly, when the movable element 300 rotates with the axis AX1 as the axis of rotation, the rotary element 300 is displaced along the other axis AX2, and the first thread 220a of the movable element 200 is guided by the second thread 310a of the rotary element 300 so that the movable element 200 and the rotary element 300 approach one another. In some embodiments, the second alignment structure 320 can be a split type ring 320a having a plurality of grooves. For instance, the normal vector N of a plane P where the split type ring 320a is located is parallel to the axis AX1.

The rotary element 300 can further include a rotary pressing unit 330 and a third alignment structure 340. The rotary pressing unit 320 can be disposed between the second alignment structure 320 and the second threaded unit 310. In some embodiments, the rotary pressing unit 330 can be a column. The column includes, for instance, an outer bottom surface 330a and an inner bottom surface 330b. The outer bottom surface 330a can be connected to the second alignment structure 320, and the inner bottom surface 330b is opposite to the outer bottom surface 330a and faces the second threaded unit 310. The area of the outer bottom surface 330a is, for instance, greater than the area of the inner bottom surface 330b. In other words, the rotary pressing unit 330 can be a column having an inclined surface, and the inclined surface is connected to the outer bottom surface 330a and the inner bottom surface 330b. The third alignment structure 340 can be located between the rotary pressing unit 330 and the second threaded unit 310 and connected to the second threaded unit 310. In some embodiments, the grooves of the split type ring 320 can extend to the third alignment structure 340 in a direction toward the rotary pressing unit 330.

Figure 4A:
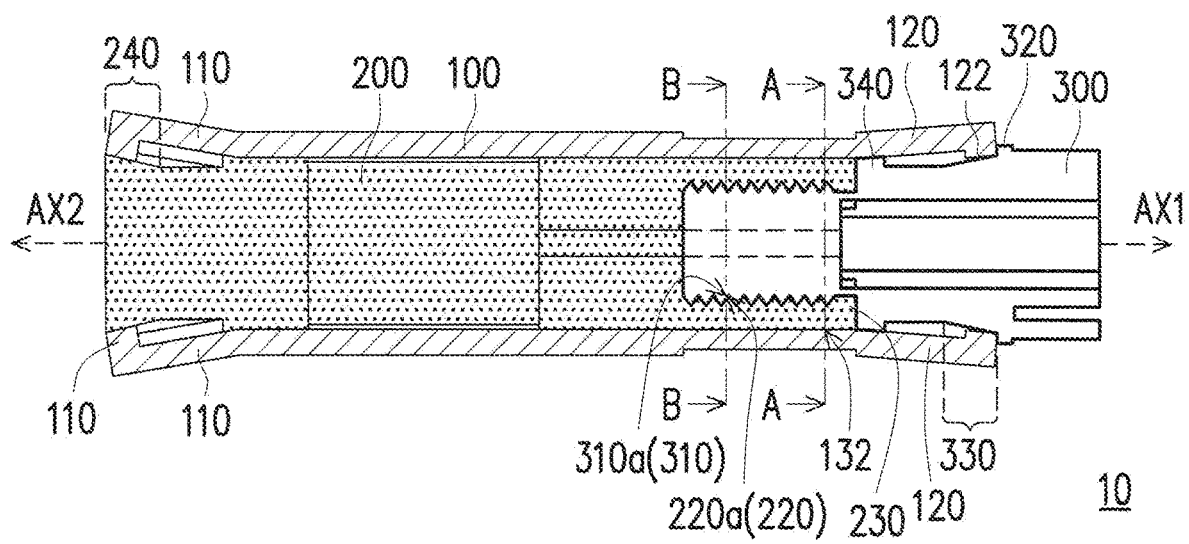
FIG. 4A is a schematic cross-sectional view of an apparatus with two anchors according to an embodiment of the disclosure after assembly.
Figure 4B:
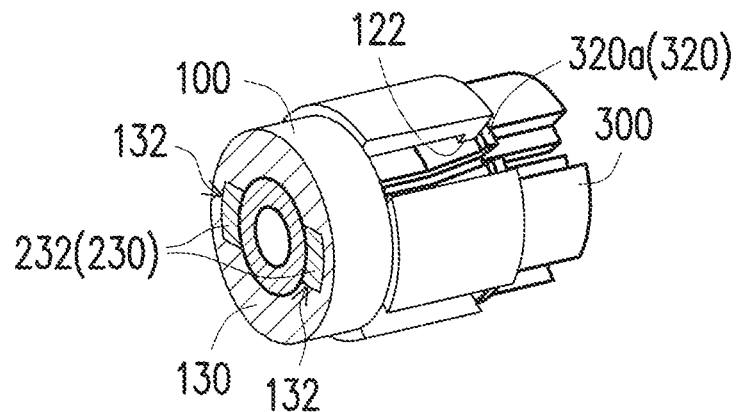
FIG. 4B is a schematic cross-sectional view along line A-A in FIG. 4A.
Figure 4C:
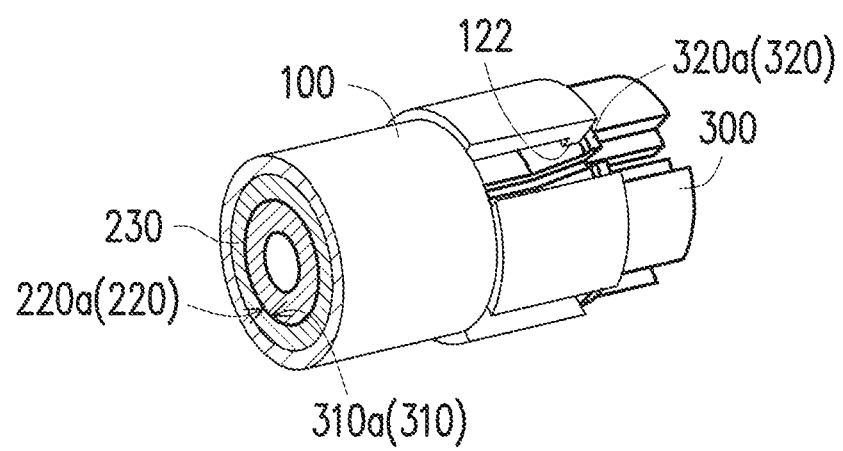
FIG. 4C is a schematic cross-sectional view along line B-B in FIG. 4A.

FIG. 4A is a schematic cross-sectional view according to an embodiment of the disclosure after assembly. The embodiment is an apparatus with two anchors. FIG. 4B is a schematic cross-sectional view along line A-A in FIG. 4A, and FIG. 4C is a schematic cross-sectional view along line B-B in FIG. 4A. Please refer to FIG. 4A to FIG. 4C for the assembly of the housing 100, the movable element 200, and the rotary element 300 in the apparatus with two anchors 10. When the first alignment structure 230 is abutted against the third alignment structure 340, the movable pressing unit 240 of the movable element 200 displaces an end of the first expansion unit 110 of the housing 100 away from the axis AX1, and the rotary pressing unit 330 of the rotary element 300 displaces an end of the second expansion unit 120 of the housing 100 away from the axis AX1. In other words, when the movable element 200 and the rotary element 300 enter the housing 100 along the axis AX1 to be coupled, the movable pressing unit 240 of the movable element 200 and the rotary pressing unit 330 of the rotary element 300 are moved while facing each other, and the movable pressing unit 240 and the rotary pressing unit 330 expand the first expansion unit 110 and the second expansion unit 120 of the housing 100 at the same time to form two anchors that can fix the apparatus with two anchors in a hole. Therefore, in comparison to a known force sensing apparatus for which only one end can be fixed, the apparatus with two anchors 10 of an embodiment of the disclosure can be extensively applied in holes of a variety of environments (such as a hole in a wall or a hole in a machine) and increase securement and stability.

In some embodiment, when the apparatus with two anchors 10 is disposed in a production machine, since the first expansion unit 110 and the second expansion unit 120 are respectively abutted against the movable pressing unit 240 and the rotary pressing unit 330, the sensing unit 210 of the apparatus with two anchors 10 can be subjected to an even force, and the issues associated with concentrated stress do not occur, so that the reliability of the sensing unit 210 in the apparatus with two anchors 10 is increased. Therefore, in an embodiment in which the sensing unit 210 is disposed in the space 200SP of the movable element 200, the sensing unit 210 can more accurately detect a desired physical quantity without the generation of fatigue. In an embodiment in which the movable pressing unit 240 and the rotary pressing unit 330 are respectively inclined surfaces, the position at which the first expansion unit 110 is abutted against the inclined surface of the movable pressing unit 240 and the position at which the second expansion unit 120 is abutted against the rotary pressing unit 330 can be adjusted to change the measurement sensitivity of the sensing unit 210 to adapt to the requirements of different manufacturing machines. Therefore, in an embodiment in which the sensing unit 210 is disposed in the space 200SP of the movable element 200, the sensing unit 210 can more accurately detect a desired physical quantity. Therefore, the apparatus with two anchors in the disclosure can retain reliability after sustaining repeated impacts, and the sensitivity thereof can be optimized according to the impact forces of different machines.

In some embodiments, when the first threaded unit 220 of the movable element 200 and the second threaded unit 310 of the rotary element 300 enter the housing 100 and are coupled along the axis AX1, the first alignment structure 230 of the movable element 200 is coupled with the anti-rotation structure 132 of the housing 100 to form the rotation restraint structure RR. For instance, the first alignment structure 230 is a first bump 232 and is extended along the axis AX1. The anti-rotation structure 132 is a groove of complementary shape to the first bump 232 and is extended along the axis AX1. The anti-rotation structure 132 (groove) is, for instance, disposed on the inner surface of the linkage 130 as shown in FIG. 4B. Therefore, the first bump 232 is abutted against the anti-rotation structure 132 (groove) to prevent the movable element 200 from rotating.

Figure 5:
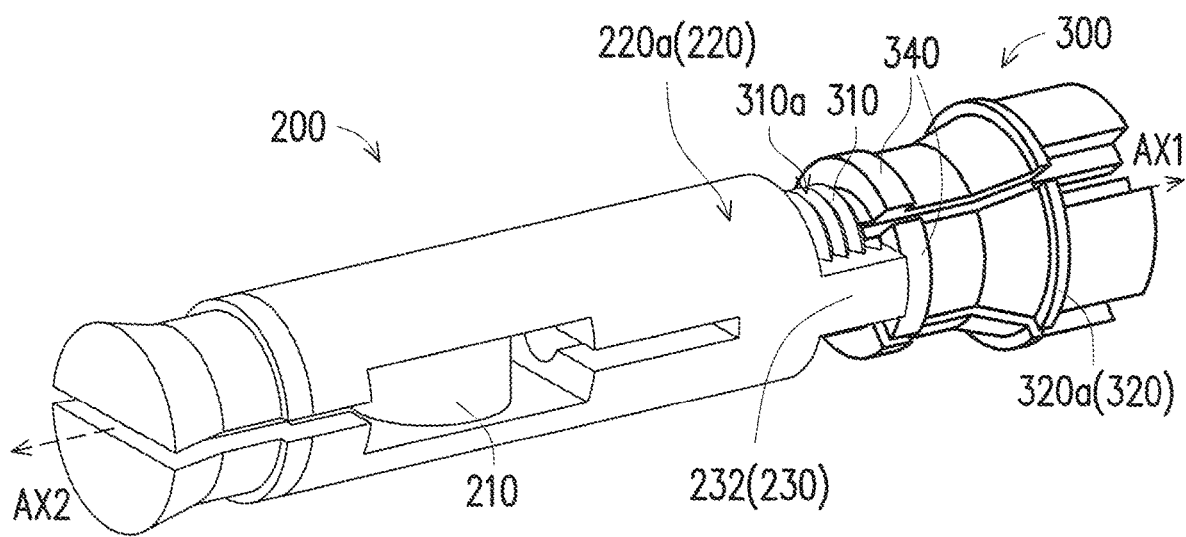
FIG. 5 is a schematic of a movable element and a rotary element of an apparatus with two anchors according to an embodiment of the disclosure after assembly.

Referring to both FIG. 4C and FIG. 5, when the first thread 220a of the movable element 200 and the second thread 310a of the rotary element 300 enter the housing 100 and are coupled along the axis AX1, the second alignment structure 320 of the rotary element 300 is coupled with the stopping structure 122 of the housing 100 to form the translation restraint structure TR. For instance, the second alignment structure 320 can be a split type ring 320a. When the rotary element 300 rotates with the axis AX1 as the axis of rotation and the movable element 200 is displaced toward the rotary element 300 to reach the maximum travelling distance allowed, the first alignment structure 230 of the movable element 200 is abutted against the third alignment structure 340 of the rotary element 300 and the split type ring 320a of the rotary element 300 is abutted against the stopping structure 122 of the housing 100 so as to restrain the displacement of the rotary element 300 along the axis AX2. To show more clearly the assembly manner of the apparatus with two anchors 10 of an embodiment of the disclosure, the coupling configuration between the movable element 200 and the rotary element 300 and the assembly configuration between the movable element 200 and the housing 100 are described in the following sections.

FIG. 5 is a schematic of the movable element 200 and the rotary element 300 according to an embodiment of the disclosure after coupling. The embodiment is an apparatus with two anchors. Referring to FIG. 5, the first thread 220a of the movable element 200 can be coupled to the second thread 310a matching with the first thread 220a. Therefore, when the rotary element 300 rotates with the axis AX1 as the axis of rotation, the rotary element 300 is displaced towards the other axis AX2, and the first thread 220a of the first threaded unit 220 is guided by the second thread 310a of the rotary element 300, so that the movable element 200 is moved close to the rotary element 300. When the movable element 200 is displaced along the axis AX1, the movable element 200 gradually approaches the rotary element 300. When the movable element 200 reaches the maximum travelling distance allowed, the third alignment structure 340 of the rotary element 300 and the first bump 232 of the movable element 200 are abutted against each other, so that the movable element 200 and the rotary element 300 cannot approach any further.

Figure 6A:
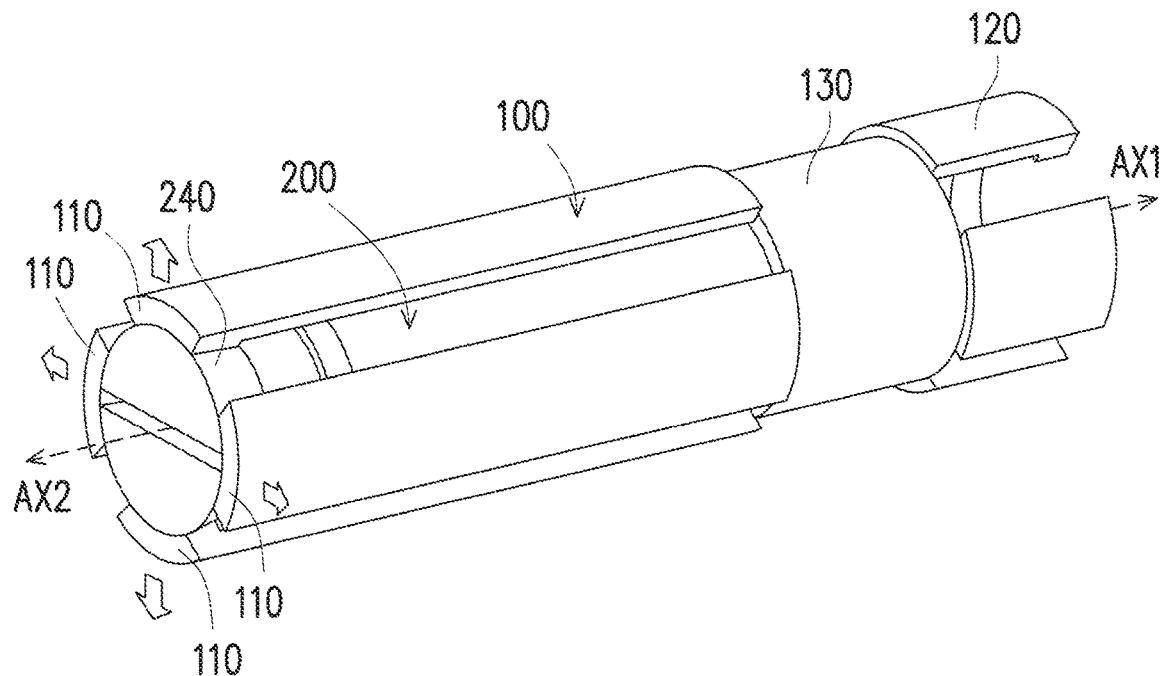
FIG. 6A is a schematic of a movable element and a housing of an apparatus with two anchors according to an embodiment of the disclosure after assembly.
Figure 6B:
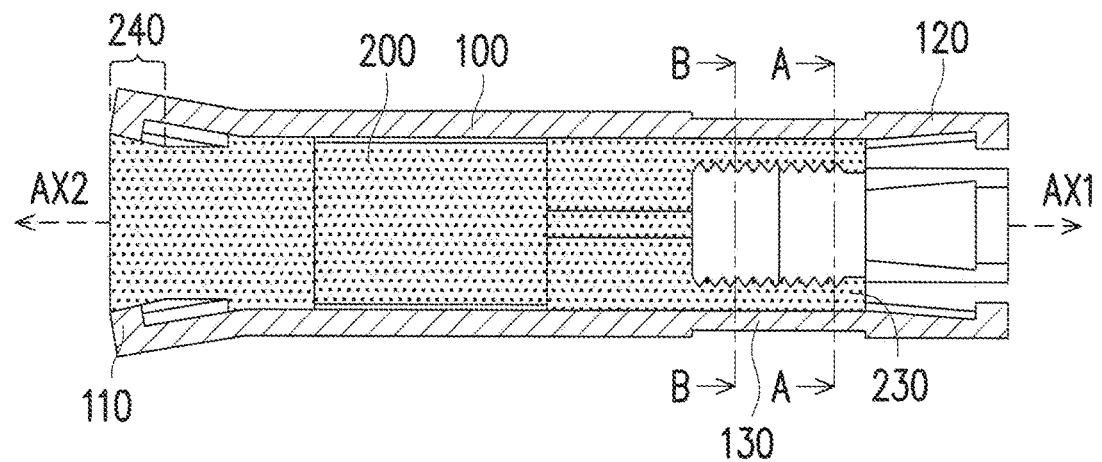
FIG. 6B is a schematic cross-sectional view of a movable element and a housing of the apparatus with two anchors in FIG. 6A after assembly.

FIG. 6A is a schematic of the movable element 200 and the housing 100 according to an embodiment of the disclosure after assembly. The embodiment is an apparatus with two anchors. FIG. 6B is a schematic cross-sectional view of the movable element 200 and the housing 100 of the apparatus with two anchors in FIG. 6A after assembly. First, referring to FIG. 6A and FIG. 6B, when the movable element 200 enters the housing 100 along the axis AX1 and reaches the maximum displacement distance allowed, the first alignment structure 230 is abutted against the interface of the second expansion unit 120 and the linkage 130 of the housing 100, and the movable pressing unit 240 displaces an end of the first expansion unit 110 of the housing 100 away from the axis AX1 (as shown by the arrows in FIG. 6A). In other words, the first expansion unit 110 of the housing 100 is expanded by the movable pressing unit 240 of the movable element 200 to form an expansion structure as shown in FIG. 6B. The first expansion unit 110 of the housing 100 is abutted against the position of the movable pressing unit 240, and the position can be adjusted to optimize the sensitivity as needed to adapt to the requirements of different production machines.

Figure 7A:
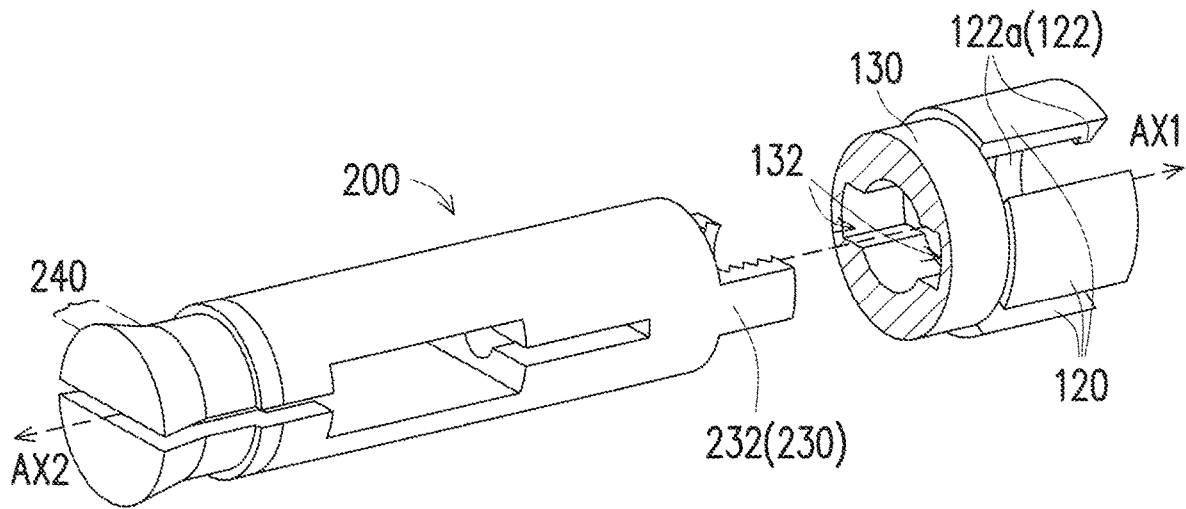
FIG. 7A is a schematic of a movable element and part of a housing of an apparatus with two anchors before assembly according to an embodiment of the disclosure.
Figure 7B:
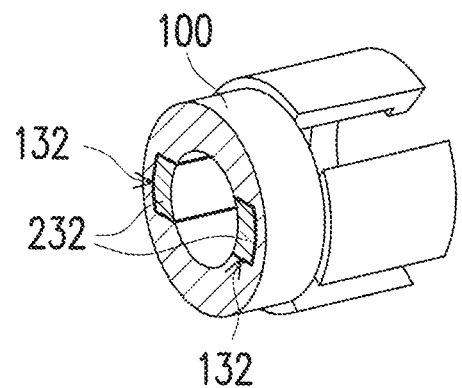
FIG. 7B is a schematic cross-sectional view along line A-A in FIG. 6B.
Figure 7C:
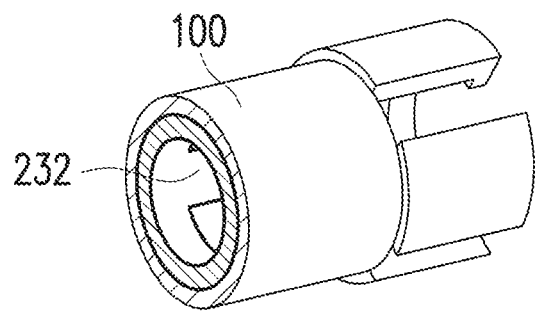
FIG. 7C is a schematic cross-sectional view along line B-B in FIG. 6B.

FIG. 7A is a schematic of the movable element 200 and the housing 100 before assembly according to an embodiment of the disclosure. The embodiment is an apparatus with two anchors. FIG. 7B is a schematic cross-sectional view along line A-A in FIG. 6B, and FIG. 7C is a schematic cross-sectional view along line B-B in FIG. 6B. To describe more clearly the anti-rotation restraining mechanism of the apparatus with two anchors, in FIG. 7A is portrayed a part of the housing 100 to better show the anti-rotation structure 132 (groove) located at the linkage 130. Referring to FIG. 7A to FIG. 7C, for instance, after the first alignment structure 230 (the first bump 232) is coupled to the anti-rotation structure 132 of the housing 100, since the first bump 232 is in contact with the groove of the anti-rotation structure 132, the movable element 200 can move along the direction of the axis AX1 or the axis AX2 and does not rotate with the axis AX1 or the axis AX2 as the axis of rotation. By effect of the anti-rotation restraining mechanism described above, when the apparatus with two anchors is assembled, only the rotary element 300 rotates along the axis AX1 to guide the movable element 200 to move toward the direction of the rotary element 300, and the movable element 200 does not rotate with the rotary element 300 as a result.

Based on the above, in the apparatus with two anchors of an embodiment of the disclosure, the sensing unit can be disposed in the space of the movable element to detect a physical quantity. By effect of the design in which the slots open through the movable element, stress will not concentrate on the sensing unit to prevent fatigue to the sensing unit, so as to increase the reliability of the sensing unit. Moreover, the housing includes the anti-rotation structure, so that when the apparatus with two anchors is assembled, only the rotary element rotates along an axis to guide the movable element to move along the direction of the rotary element, and the movable element does not rotate with the rotary element. When the first threaded unit of the movable element and the second threaded unit of the rotary element enter the housing and are coupled along an axis, the first alignment structure and the anti-rotation structure are coupled, the second alignment structure is coupled with the stopping structure, and the movable pressing unit and the rotary pressing unit expand the first expansion unit and the second expansion unit of the housing at the same time to form two anchors. In comparison to a known force sensing apparatus for which only one end can be fixed in a hole, the apparatus with two anchors of an embodiment of the disclosure can be extensively applied in holes of a variety of environments (such as a hole in a wall or a hole in a machine) with increased securement and stability. Moreover, the sensitivity of the apparatus with two anchors of an embodiment of the disclosure can be optimized by adjusting the position at which the first expansion unit is abutted against the movable pressing unit and the position at which the second expansion unit is abutted against the rotary pressing unit so that the sensing unit can accurately detect fine changes of a desired physical quantity.

It will be apparent to those skilled in the art that various modifications and variations can be made to the structure of the disclosed embodiments without departing from the scope or spirit of the disclosure. In view of the foregoing, it is intended that present invention, including modifications and variations of the invention provided, falls within the scope of the following claims and their equivalents.

What is claimed is:

1. An apparatus with two anchors, comprising:
   a housing, comprising:
      at least one first expansion unit;
      at least one second expansion unit, comprising:
         at least one stopping structure; and
      a linkage connected to the at least one first expansion unit and the at least one second expansion unit, comprising:
         at least one anti-rotation structure;
   a movable element, comprising:
      a first threaded unit disposed at a side of the movable element; and
      at least one first alignment structure; and
   a rotary element, comprising:
      a second threaded unit disposed at a side of the rotary element; and
      at least one second alignment structure disposed at another side of the rotary element;
   wherein when the first threaded unit and the second threaded unit enter the housing and are coupled along an axis, the at least one first alignment structure and the at least one anti-rotation structure are coupled, and the at least one second alignment structure is coupled with the at least one stopping structure.

2. The apparatus with two anchors of claim 1, wherein the at least one anti-rotation structure prevents a rotation of the movable element and the at least one stopping structure restricts a moving distance of the rotary element.

3. The apparatus with two anchors of claim 1, further comprising a first thread and a second thread, wherein the first thread is disposed on an inner surface of the first threaded unit and the second thread is disposed on an outer surface of the second threaded unit.

4. The apparatus with two anchors of claim 1, wherein the at least one first alignment structure is a first bump and the at least one anti-rotation structure is a groove, an extending direction of each of the first bump and the groove is parallel to the axis, and the groove is disposed on an inner surface of the linkage.

5. The apparatus with two anchors of claim 1, wherein the at least one second alignment structure is a split type ring and the at least one stopping structure is a second bump, a normal vector of a plane where the split type ring is located is parallel to the axis, and an extending direction of the second bump is perpendicular to the axis.

6. The apparatus with two anchors of claim 1, wherein the rotary element further comprises a rotary pressing unit, and the rotary pressing unit is disposed between the at least one second alignment structure and the second threaded unit.

7. The apparatus with two anchors of claim 6, wherein the rotary pressing unit of the rotary element is a column, the column comprises an outer bottom surface and an inner bottom surface, the outer bottom surface is connected to the at least one second alignment structure, and an area of the outer bottom surface is greater than an area of the inner bottom surface.

8. The apparatus with two anchors of claim 7, wherein the movable element further comprises at least one space, at least two slots, and a movable pressing unit, the at least one space and the at least two slots open through the movable element, the at least two slots are disposed at two sides of the at least one space, and the at least two slots are communicated with the at least one space.

9. The apparatus with two anchors of claim 8, wherein a slot in the at least two slots is disposed between the at least one space and the first threaded unit, and another slot in the at least two slots opens through the movable pressing unit of the movable element.

10. The apparatus with two anchors of claim 8, wherein the movable element further comprises a sensing unit, and the sensing unit is disposed in the at least one space.

11. An apparatus with two anchors, comprising:
a housing, comprising:
at least one first expansion unit;
at least one second expansion unit, comprising:
at least one stopping structure; and
a linkage connected to the at least one first expansion unit and the at least one second expansion unit, comprising:
at least one anti-rotation structure;
a movable element, comprising:
a first threaded unit disposed at a side of the movable element;
at least one alignment structure;
at least one space;
at least two slots; and
a rotary element, comprising:
a second threaded unit disposed at a side of the rotary element; and
at least one second alignment structure disposed at another side of the rotary element;
wherein when the first threaded unit and the second threaded unit enter the housing and are coupled along an axis, the at least one first alignment structure and the at least one anti-rotation structure are coupled, and the at least one second alignment structure is coupled with the at least one stopping structure, the at least one space and the at least two slots open through the movable element, the at least two slots are disposed at two sides of the at least one space, and the at least two slots are communicated with the at least one space.

12. The apparatus with two anchors of claim 11, wherein the at least one anti-rotation structure prevents a rotation of the movable element and the at least one stopping structure restricts a moving distance of the rotary element.

13. The apparatus with two anchors of claim 11, wherein a slot in the at least two slots is disposed between the at least one space and the first threaded unit, and another slot in the at least two slots opens through a movable pressing unit of the movable element.

14. The apparatus with two anchors of claim 11, wherein the movable element further comprises a sensing unit, and the sensing unit is disposed in the at least one space.

15. An apparatus with two anchors suitable for detecting a physical quantity, comprising:
a housing, comprising:
at least one first expansion unit;
at least one second expansion unit, comprising:
at least one stopping structure; and
a linkage connected to the at least one first expansion unit and the at least one second expansion unit, comprising:
at least one anti-rotation structure;
a movable element, comprising:
a first threaded unit disposed at a side of the movable element;
at least one first alignment structure;
at least one space;
at least two slots; and
a rotary element, comprising:
a second threaded unit disposed at a side of the rotary element;
at least one second alignment structure disposed at another side of the rotary element; and
a rotary pressing unit disposed between the second threaded unit and the at least one second alignment structure;
wherein when the first threaded unit and the second threaded unit enter the housing and are coupled along an axis, the at least one first alignment structure and the at least one anti-rotation structure are coupled and the at least one second alignment structure and the at least one stopping structure are coupled, the at least one space and the at least two slots open through the movable element, the at least two slots are disposed at two sides of the at least one space, and the at least two slots are communicated with the at least one space.

16. The apparatus with two anchors of claim 15, wherein the at least one anti-rotation structure prevents a rotation of the movable element and the at least one stopping structure restricts a moving distance of the rotary element.

17. The apparatus with two anchors of claim 15, wherein the rotary pressing unit of the rotary element is a column, the column comprises an outer bottom surface and an inner bottom surface, the outer bottom surface is connected to the at least one second alignment structure, and an area of the outer bottom surface is greater than an area of the inner bottom surface.

18. The apparatus with two anchors of claim 15, wherein a slot in the at least two slots is disposed between the at least one space and the first threaded unit, and another slot in the at least two slots opens through a movable pressing unit of the movable element.

19. The apparatus with two anchors of claim 15, wherein the movable element further comprises a sensing unit, and the sensing unit is disposed in the at least one space.

20. The apparatus with two anchors of claim 19, wherein the sensing unit comprises an electromechanical conversion unit.

* * * * *